United States Patent [19]

Johnston et al.

[11] Patent Number: 5,515,262
[45] Date of Patent: May 7, 1996

[54] VARIABLE INDUCTANCE CURRENT LIMITING REACTOR

[75] Inventors: David F. Johnston, Yorktown, Va.; Peter T. Bircsak, Hampton, N.J.

[73] Assignees: Hitran Corporation, Flemington, N.J.; BHS Group, Inc., Kansas City, Mo.

[21] Appl. No.: 350,934

[22] Filed: Dec. 7, 1994

Related U.S. Application Data

[63] Continuation of Ser. No. 949,499, filed as PCT/4591/01745, Mar. 14, 1991, abandoned.

[51] Int. Cl.⁶ ................................................. H02M 7/68
[52] U.S. Cl. ............................ 363/90; 363/86; 323/249; 323/903; 96/80
[58] Field of Search ............................... 96/18, 19, 22, 96/23, 80; 336/155, 160, 165; 363/82, 86, 90; 323/903, 249, 250, 251, 253

[56] References Cited

U.S. PATENT DOCUMENTS

| | | | |
|---|---|---|---|
| 1,372,653 | 3/1921 | Dessauer . | |
| 1,702,771 | 2/1929 | Groeneveld . | |
| 1,732,715 | 10/1929 | Dessauer et al. . | |
| 1,896,480 | 2/1933 | Christopher . | |
| 2,843,215 | 7/1958 | Streuber . | |
| 2,878,455 | 3/1959 | Lamberton et al. | 336/183 |
| 3,374,609 | 3/1968 | Kide | 55/105 |
| 3,483,499 | 12/1969 | Lugter | 336/180 |
| 3,507,096 | 4/1970 | Hall et al. | 55/105 |
| 3,708,744 | 1/1973 | Stephens et al. | 336/155 |
| 3,873,282 | 3/1975 | Finch | 55/105 |
| 4,020,438 | 4/1977 | Manimalethu | 336/5 |
| 4,343,034 | 8/1982 | Wells et al. | 363/82 |
| 4,405,965 | 9/1983 | Weldon et al. | 361/43 |
| 4,513,274 | 4/1985 | Halder | 336/173 |
| 4,558,271 | 12/1985 | Poole | 323/306 |
| 4,587,475 | 5/1986 | Finney, Jr. et al. | 323/903 |
| 4,590,453 | 5/1986 | Weissman | 336/180 |
| 4,600,411 | 7/1986 | Santamaria | 55/139 |
| 4,808,200 | 2/1989 | Dalhammer et al. | 55/105 |
| 4,916,425 | 4/1990 | Zabar | 336/177 |
| 4,973,930 | 11/1990 | Mai et al. | 336/171 |
| 5,068,811 | 11/1991 | Johnston et al. | 364/551.01 |

FOREIGN PATENT DOCUMENTS

| | | | |
|---|---|---|---|
| 3048979 | 10/1982 | Germany | 96/19 |
| 205342A | 12/1983 | Germany | B03C 3/02 |
| 684524 | 9/1979 | U.S.S.R. | 323/251 |
| 2216348 | 10/1989 | United Kingdom | H02M 1/12 |

*Primary Examiner*—Jeffrey L. Sterrett
*Attorney, Agent, or Firm*—Sperry, Zoda & Kane

[57] ABSTRACT

An electrically variable current limiting reactor which is usable in association with a power supply for an electrostatic precipitator is disclosed herein. The current limiting reactor is capable of having the inductance value thereof varied responsive to system operation conditions. Most particularly the inductance of the current limiting reactor can be modified responsive to the form factor of the sinusoidal AC input current to the power supply transformer. Additionally the inductance of the current limiting reactor can be controlled responsive to the fractional conduction of the full wave rectified current waveform at the output of the full wave rectifier of the power supply. Other conditions can be monitored to control the inductance value of the current limiting reactor such as physical system parameters. An automatic operating control may modify the inductance of the current limiting reactor responsive to the current entering the primary of the transformer of the power supply.

7 Claims, 7 Drawing Sheets

VARIABLE INDUCTANCE CURRENT LIMITING REACTOR

This application is a continuation of U.S. Ser. No. 07/949,499 filed Oct. 21, 1992, now abandoned and of PCT Application No. 91/01745 filed Mar. 14, 1991, now pending.

U.S. patent application Ser. No. 07/949,499 was filed on Oct. 21, 1992 based upon PCT Application No. 91/01745 filed Mar. 14, 1991 and both of these applications as well as the below patent application have all been filed by the same applicant entity.

BACKGROUND OF THE INVENTION

1. Field Of The Invention

Continuing emphasis on environmental quality and recent new emphasis on air quality in particular have resulted in increasingly stringent regulatory control of industrial emissions. One technique which has proven highly effective in controlling air pollution is the removal of undesired particulate matter from a gas stream by electrostatic precipitation.

An electrostatic precipitator is an air pollution control device designated to electrically charge and collect particulates generated from industrial processes such as those occurring in cement plants, pulp and paper mills and utilities. Particulate-laden gas flows through the precipitator where the particles acquire a charge. These charged particles are attracted to, and collected by, oppositely-charged metal plates. The cleaned process gas may then be further processed or safely discharged to the atmosphere.

The electrostatic precipitation process involves several complicated, interrelated physical mechanisms: The creation of a nonuniform electric field and ionic current in a corona discharge; the ionic and electronic charging of particles moving in combined electro- and hydrodynamic fields; and the turbulent transport of charged particles to a collection surface. Because of this, many practical considerations can act to reduce collection efficiency.

To maximize the particulate collection, a precipitator should operate at the highest practical usable energy level, increasing both the particle charge and collection capabilities of the system. At the same time, there is an energy level above which arcing or "sparking", a temporary short which creates a conductive gas path, occurs in the system. Maximizing the efficiency of an electrostatic precipitator requires operating the system at the highest possible usable energy level.

Ideally, the electrostatic precipitator should operate constantly at its point of greatest efficiency. Unfortunately, conditions under which an electrostatic precipitator operates, such as temperature, combustion rate, and the chemical composition of the particles being collected, change constantly. This complicates calculating parameters critical to a precipitator's operation.

2. Description Of The Prior Art

This invention relates to electrostatic precipitators in general and specifically to precipitator power supplies. Prior art precipitator power supplies have used either saturable core reactors or silicon-controlled rectifiers (SCRs) paired with a fixed-value current-limiting reactor (CLR). This invention relates to an improvement of the CLR.

Prior art CLRs have an inductance of fixed value with several taps for selecting other values. The number of taps available is limited, typically to three. Adjusting the inductance of the CLR requires that the precipitator field section be powered down and taps manually changed.

A CLR of the correct value contributes to protecting the precipitator power supply from the destructive effects of arcing or spark currents and ensures greater electrical and particulate collection efficiencies.

Prior art devices useful for voltage and current control of power supplies have been disclosed in various patents including U.S. Pat. No. 1,372,653 issued Mar. 22, 1921 to F. Dessauer on an Electrical Transformer System; U.S. Pat. No. 1,702,771 issued Feb. 19, 1929 to Y. Groeneveld on an Amplifying Transformer; U.S. Pat. No. 1,732,715 issued Oct. 22, 1929 to F. Dessauer et al on an Electromagnetic Induction Apparatus; U.S. Pat. No. 1,896,480 issued Feb. 7, 1933 to A. Christopher on a Balanced Inductance Device; U.S. Pat. No. 2,878,455 issued Mar. 17, 1959 to C. Lamberton et al on a Three Winding Transformer; U.S. Pat. No. 3,483,499 issued Dec. 9, 1969 to L. Lugten on an Inductive Device; U.S. Pat. No. 4,020,438 issued Apr. 26, 1977 to A. Manimalethu on an Autotransformer With Series And Tertiary Windings Having Same Polarity Impedance; U.S. Pat. No. 4,513,274 issued Apr. 23, 1985 to M. Halder on a Current Transformer For Measuring Instruments; U.S. Pat. No. 4,590,453 issued May 20, 1986 to A. Weissman on an Autotransformer With Common Winding Having Oppositely Wound Sections; U.S. Pat. No. 4,916,425 issued Apr. 10, 1990 to N. Zabar on an Electromagnetic Device and U.S. Pat. No. 4,973,930 issued Nov. 27, 1990 to U. Mai et al on a Twin Coil.

An alternative to the silicon-controlled rectifiers paired with a fixed-value current limiting reactor is a saturable core reactor. The saturable core reactor (or saturable reactor) was originally developed in Germany and was used in the United States extensively from 1945 forward. The principal application has been to control the power applied to heating elements. Saturable reactors are electrically and mechanically rugged. In recent years, their functions have been largely taken over by silicon-controlled rectifiers; as a consequence, the saturable reactor has been relegated to obscurity.

SUMMARY OF THE INVENTION

The present invention generally provides a current limiting reactor for use within a power supply system for a electrostatic precipitator wherein the inductance of the current limiting reactor can be electrically, automatically and continuously modified responsive to system conditions. By continuous monitoring of the correct system conditions the variation in the inductance of the current limiting reactor can increase the average voltage and current within the precipitator field. The ultimate result of this more careful and accurate control is that the destructive effects of spark currents on equipment are minimized and the electrical and particle collection efficiencies are enhanced. Furthermore the overall average voltage and current in the precipitator fields can be increased before spark over actually occurs such as to permit a higher overall power level before spark over. Furthermore it is particularly important that the variable current limiting reactor of the present invention be constructed such as to automatically attain its maximum inductance value if an open circuit condition occurs in the control circuit or control winding. In this manner the automatic protection of equipment will be achieved if excitation of the control winding is lost.

The basic precipitator power supply includes a silicon controlled rectifier stack which preferably includes two individual silicon control rectifiers connected in an inverse parallel configuration in series between a line voltage power source and the current limiting reactor. An automatic control can be operative to modify the output of the silicon control rectifier stack to modify the power output of the silicon controlled rectifier stack. When operated at maximum power the silicon controlled rectifier stack output includes a sinusoidal AC current waveform. However when operated below the rating thereof there is a naturally occurring deterioration of the waveform in addition to the power output.

The current limiting reactor is positioned in series with respect to the silicon controlled rectifier stack. In prior art configurations this current limiting reactor was of a fixed inductance value or had various taps to allow some element of modification of the inductance thereof between fixed values. Changing of the inductance value normally required powering down the system in order to make the change in the current limiting reactor. With the present invention this current limiting reactor is dynamic and continuously responsive to system parameters in order to vary the inductance thereof.

The operative current limiting reactor is connected to a transformer rectifier set. Initially the primary of the transformer receives the low voltage and high current signal and transforms this to a high voltage and low current signal in the secondary of the transformer. The output of the step-up transformer secondary is provided to a rectifier which provides a high voltage DC signal to the precipitator to facilitate collection of particulate matter.

In one configuration of the dynamic current limiting reactor of the present invention the control winding is connected to a variable DC power source. This control winding is adapted to vary the inductance of the current limiting reactor responsive to variations in the DC power source. With this configuration electrical coupling between the control winding and the inductor winding or windings of the current limiting reactor is achieved through a magnetic core. In the preferred physical configuration two identical inductor windings are wound about a magnetic core. The core extending through each inductor winding extends through the control winding in opposite directions to yield a resultant instantaneous flux through the control winding of zero. As such with this configuration the inductance of the CLR control device is a function of the magnitude of the DC current passing through the control winding.

Operation of the control winding can be automatic responsive to sensed system conditions such as the dynamic variables within the precipitator field. These dynamic variables can depend upon the type of material being precipitated, the temperature or pressure conditions or other various dynamic conditions. Variation in the DC power source can be achieved manually by an operator responsive to visual reading of the parameters or can be automatically variable.

Preferably variation in DC power supply to the control winding is responsive to the shape of the AC waveform at the input of the primary of the transformer rectifier set or is responsive to the shape of the rectified AC wave at the output of the transformer rectifier set. Both the maintenance of a low form factor and the maintenance of a high secondary fractional conduction have been shown to be excellent parameters for maintaining accurate control of variations in the inductance of the current limiting reactor as will be shown in more detail below.

As an alternative configuration the present invention can include a somewhat modified automatic system for controlling the inductance of the current limiting reactor wherein a current transformer utilizes the primary current passing in series from the silicon controlled rectifier to the transformer rectifier set as the primary with a transformer secondary winding extending thereabout. The output signal of the current transformer secondary winding is rectified by a conventional full wave bridge rectifier and is provided to the control winding of the current limiting reactor control winding. The DC current through this control winding will then modify the inductance of the inductor winding which is in series between the silicon controlled rectifier stack and the current transformer primary. In this manner the inductance value of the inductor winding of the current limiting reactor will be proportionally responsive to the current at the primary of the transformer rectifier set.

It is an object of the present invention to provide an electrically variable current limiting reactor wherein utilization with an electrostatic precipitator is greatly enhanced.

It is an object of the present invention to provide an electrically variable current limiting reactor wherein variation in the inductance therein is made possible responsive to system parameters.

It is an object of the present invention to provide an electrically variable current limiting reactor particularly usable with a power supply for an electrostatic precipitator wherein a low form factor of the input current signal at the primary of the transformer rectifier set is maintained.

It is an object of the present invention to provide an electrically variable current limiting reactor particularly usable with a power supply for an electrostatic precipitator wherein a high secondary fractional conduction at any power level is achieved at the output of the full wave rectifier of the transformer rectifier set.

It is an object of the present invention to provide an electrically variable current limiting reactor particularly usable with a power supply for an electrostatic precipitator wherein the destructive effects of arcing or spark currents are minimized.

It is an object of the present invention to provide an electrically variable current limiting reactor particularly usable with a power supply for an electrostatic precipitator wherein greater electrical and particulate collection efficiencies are achieved.

It is an object of the present invention to provide an electrically variable current limiting reactor particularly usable with a power supply for an electrostatic precipitator wherein modifications of the inductance of the current limiting reactor can be achieved without having the precipitator field powered down.

It is an object of the present invention to provide an electrically variable current limiting reactor particularly usable with a power supply for an electrostatic precipitator wherein the overall average voltage and current in the precipitator field is increased before spark over occurs thereby permitting a higher overall power level before spark over.

It is an object of the present invention to provide an electrically variable current limiting reactor particularly usable with a power supply for an electrostatic precipitator wherein the current limiting reactor automatically goes to maximum inductance value responsive to an open circuit occurring within the control circuit or the control winding.

It is an object of the present invention to provide an electrically variable current limiting reactor particularly usable with a power supply for an electrostatic precipitator wherein automatic protection of all equipment is provided if the control winding excitation is lost.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
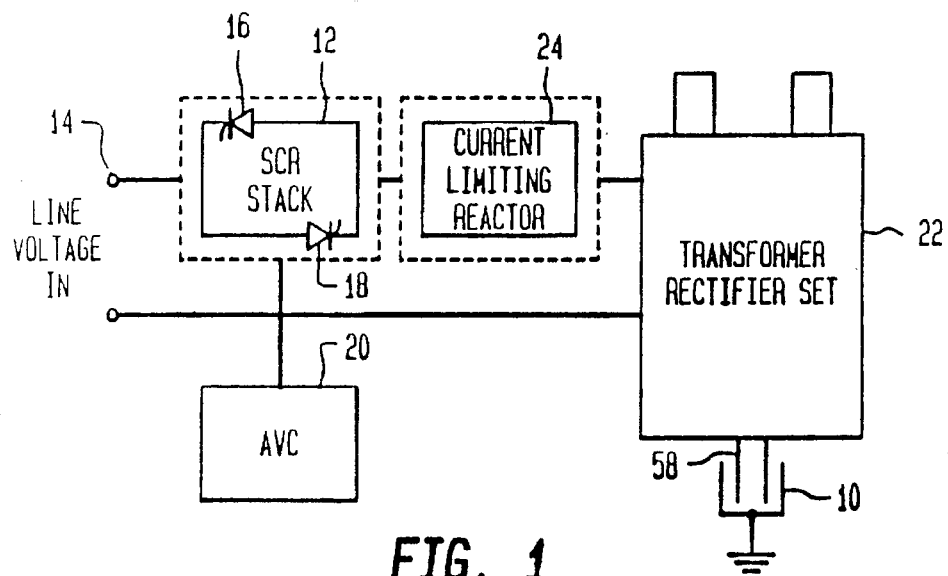
FIG. 1 is a schematic illustration of a typical precipitator power system.

The present invention is designed to provide a precipitator field 10 where particulate matter is actually collected. It is made up of collecting plates connected to one side of the precipitator power supply. The other side of the supply is connected to discharge electrodes 58 which are uniformly spaced from the collection plates. The field, in effect, forms a capacitor, two conductors separated by an insulating material. The precipitator power supply is operated at a very high direct-current voltage which charges particulates entering the field as well as causing them to be attracted to the collecting plates. As the voltage of the precipitator power supply is increased, particulate collection increases. The voltage cannot be increased infinitely, however; the practical high-voltage ceiling is limited by the electrical ratings of the equipment and by the occurrence of sparking in the field.

Sparking in the field occurs when the voltage is high enough to ionize the gas between a discharge electrode and a collecting plate. Ionized gas is a conductor, so the result is a localized electrical breakdown of the gas causing energy stored in the capacitive field to be discharged through the breakdown, somewhat like lightning. This event defines the maximum energy level that can be sustained in the precipitator field at the time it happens. When a spark occurs, it is effectively a short across the secondary of the transformer-rectifier (TR) set 22. If the precipitator power supply is not interrupted when a spark occurs, the spark may be maintained, causing current flow in the precipitator to become very high as energy is gained from the power supply. Spark currents are wasted energy; they do not contribute to the collection of particulates. Uncontrolled, they damage precipitator system components, both mechanical and electrical, and greatly reduce collection efficiency.

To determine the size of the precipitator field, many factors must be considered: The type of material being collected, the size and resistivity of the particles, and the operating temperature are principal among them. In most industrial precipitators, more than one field is used. A typical application will find precipitator fields arranged one behind another as inlet field, second field, third field, outlet field, etc.

A transformer rectifier (TR) set 22 is a combination step-up transformer and full-wave rectifier. The transformer transforms the primary voltage to a very high secondary voltage and transforms the primary current to a low secondary current. The rectifier converts the alternating current (AC) output from the secondary of the transformer to full-wave rectified DC. A typical TR set used in a precipitator application is filled with oil for cooling and insulation. Typical ratings might be:

| | |
|---|---|
| RMS Primary voltage: | 400 VAC |
| RMS Primary current: | 240 Amps (A) |
| Average secondary voltage: | 45,000 VDC |
| Average secondary current: | 1500 milliamps (mA) |
| Transformer turns ratio: | 1:135 |

This example of a typical TR set will be used in much of this document.

The same factors considered in sizing the precipitator field affects the selection of a TR set, along with the size of the field itself. In most industrial precipitators, one TR set is connected to one or two precipitator field sections.

Power control for a precipitator is accomplished by silicon-controlled rectifiers 16 and 18 (SCRs). An SCR is a solid-state device that acts like a switch because it has a "gate" that allows it to be turned on electrically. A first silicon-controlled rectifier 16 and a second silicon-controlled rectifier 18 are connected in an inverse-parallel configuration in series between the line voltage power source 14 and ahead of the current-limiting reactor 24 and the precipitator high voltage transformer. Each SCR conducts alternately, one on the positive half-cycle, the other on the negative half-cycle. Some form of automatic SCR voltage control 20 (typically microprocessor-based) determines which SCR is switched on and at what point in the half-cycle of the waveform. An SCR which is switched on remains on until the current flowing through it decays below what is called the "holding current", usually at or near the end of the half-cycle; it cannot be switched off in any other manner.

Figure 2:
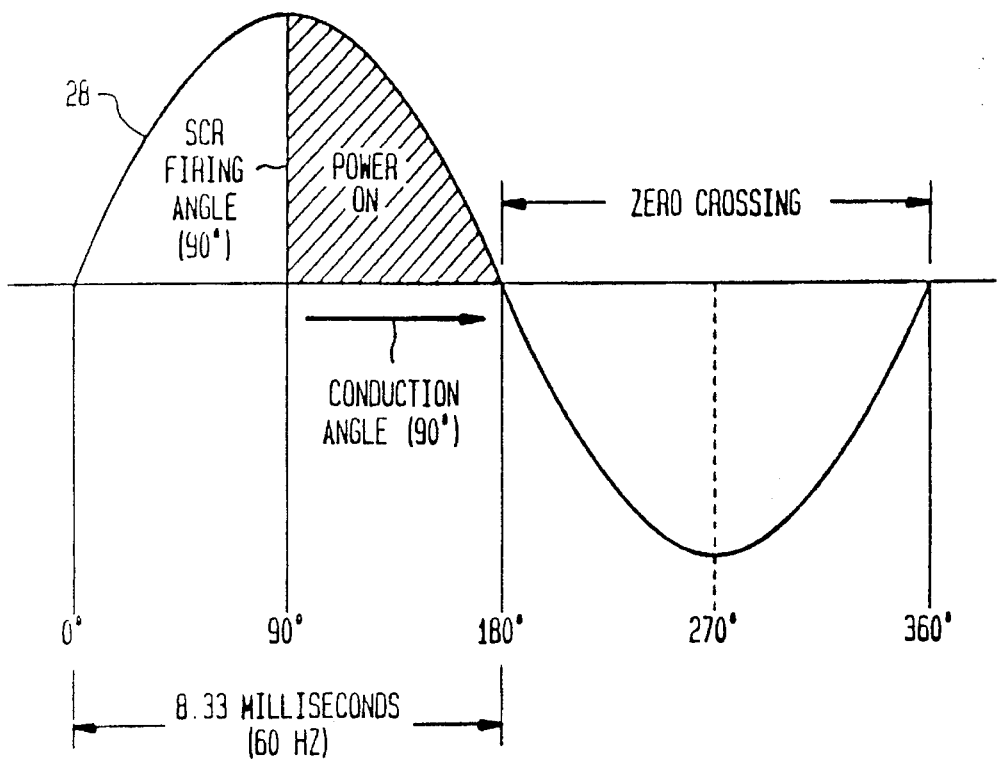
FIG. 2 is a graph of a conventional sinusoidal waveform.

A complete sine (sinusoidal) wave cycle 28, one positive half-cycle followed by one negative half-cycle, is measured in its progress by degrees from zero to 360 (FIG. 2). A half-cycle is measured in its progress from zero to 180 degrees. The point at which an SCR is turned on, or "fired", is measured in degrees from the beginning of the half-cycle and hence is called the firing angle. The part of the half-cycle during which the SCR conducts is also measured in degrees from the firing point until conduction ceases and is called the conduction angle. Power control is achieved with SCRs by varying the point in the half-cycle at which each SCR is switched on. The nature of the SCR device is such that the output from the stack is no longer a sine wave 28 because each half-cycle is "chopped" at the point in that cycle where an SCR is "fired" or switched into a conductive state.

Determining the SCR stack rating also involves several considerations. The SCRs 16 and 18 must each have a current rating that exceeds that of the TR set 22 with which they will be used. The blocking voltage of each SCR must be approximately three times the line voltage to prevent inadvertent conduction of the SCR resulting from voltage breakdown. The rate of change of voltage with respect to time (expressed as dv/dt) must also be sufficient to prevent inadvertent conduction. "Snubber" circuits are normally used on the SCR stack in precipitator applications to reduce or "snub" the dv/dt to a level appropriate to commercially-available SCRs.

The SCR automatic voltage control (AVC) measures the primary and secondary voltages and currents (some also monitor form factor and secondary fractional conduction), and is connected to the SCR stack 12. The AVC provides the triggering pulses which fire the SCRs, putting them into a state of conduction. It determines where in the electrical half-cycle to fire a particular SCR, thereby achieving power control. For example, if the AVC fired each SCR 16 or 18 at 90 degrees into the electrical half-cycle, the firing angle would be 90 degrees, the conduction angle would be 90 degrees, and exactly half of the AC power would be applied to the TR set 22. It is in this manner that the AVC 20 provides power control to ensure operation within the electrical limits of the equipment. Further, if the AVC does not fire an SCR for a half-cycle, then the output of the precipitator power supply is interrupted for that half-cycle. This permits interrupting or "quenching" sparks when the AVC detects them.

The current-limiting reactor (CLR) of prior art is an inductor of fixed value. Many prior art CLRs used in precipitator applications have taps which can be changed manually to provide a limited selection of inductance values.

The CLR 24 limits the current flow during sparking. If a spark occurs while an SCR is conducting, the spark continues until the SCR stops conducting near the end of the half-cycle. During this time, the TR set 22 effectively has a short on its secondary due to the spark and this is reflected into the primary. A properly designed TR set 22 has some circuit impedance, even with a spark, but it is not enough to significantly limit the current. Since the SCR 12 is fully turned on and the TR set 22 presents a low impedance due to the spark, the only circuit element remaining to control current flow is the CLR. Because of this, it is important that the CLR 24 have the right inductance value to control spark currents.

Another function of the CLR 24 is to shape the voltage and current waveforms. For optimum electrical and collecting efficiencies, the wave shape of the voltage and current presented at the primary of the TR set 22 must be a sine wave 28. Because the SCRs 16 and 18 chop and thereby distort the current waveform, the CLR 24 is needed to filter and restore the waveform to some approximation of the sine wave. Selecting the proper inductance value of the CLR 24 is important for this function as well.

Figure 3:
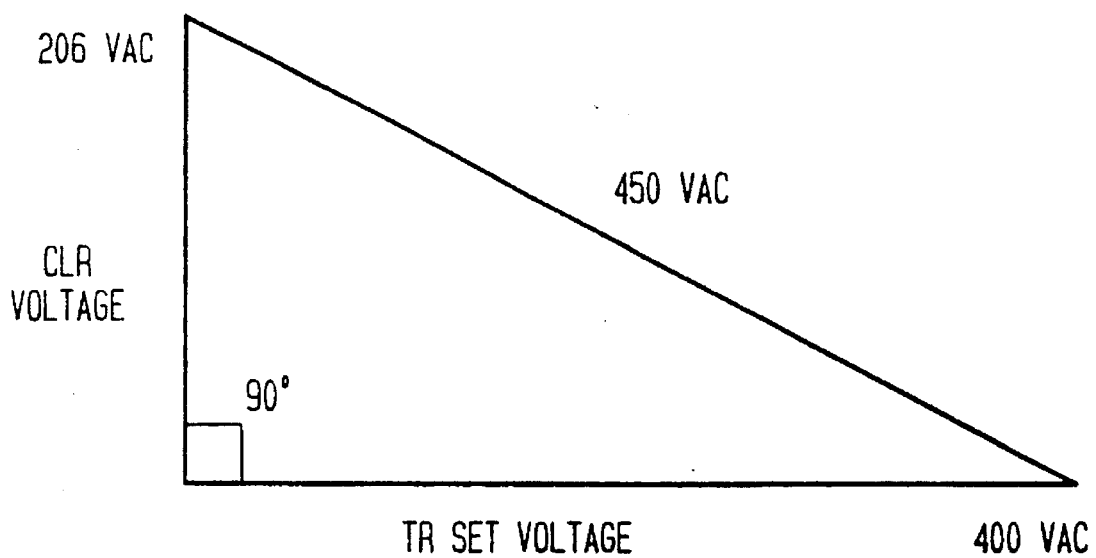
FIG. 3 is a vector diagram for determining the impedance of the current limiting reactor.

Historically, the inductance value of the CLR 24 has been determined by using a figure of 50 percent of the impedance of the TR set 22. Vector analysis of the voltages in the primary circuit of the TR set 22 illustrates this in FIG. 3.

The voltage on the primary of the TR set 22 is assumed to be at a zero-degree phase angle such that TR set 22 is purely resistive. The voltage is set at its maximum value, which is the primary voltage rating of the example TR set 22, or 400 VAC. The voltage across the CLR 24 is assumed to be at a 90-degree phase angle such that the CLR 24 is purely inductive. The voltage is to be determined.

Since the CLR 22 and TR set voltages are in a 90-degree phase angle relationship to one another, the problem presents itself as a right triangle. The voltage output from the SCR stack 12 forms the hypotenuse of the triangle. If the SCRs 16 and 18 are assumed to be at or near full conduction, i.e., a zero-degree firing angle and a 180-degree conduction angle, the magnitude of the hypotenuse will be approximately equal to the line voltage. For a 460 to 480 VAC line, 450 VAC can be assumed.

The Pythagorean theorem is used to find the unknown side of a right triangle with the formula $c^2 - a^2 = b^2$. In this instance, substitution provides $450^2 - 400^2 = CLR\ voltage^2$, and the CLR voltage is found to be the square root of 42,500, or 206 volts, approximately half the voltage on the TR set primary.

Next, it is necessary to determine the inductance of the CLR 24 that will yield the calculated voltage. Since the voltage across the CLR 24 is half that across the primary of the TR set 22, the impedance of the CLR 24 is approximately half that of the TR set 22.

The impedance of the TR set 22 is determined by dividing the primary voltage rating by the primary current rating. In this example, that is 400V/240A=1.67 ohms. Half of this figure, about 0.84 ohms, is the desired impedance. The needed inductance is determined by calculating the inductive reactance using the formula $L=X_L/(2\pi f)$. By substitution, this becomes $L=0.84/(2\times3.1416\times60)$, giving an inductance (L) of 2.2 millihenries (mH).

If the effect of a CLR 24 with a value of 50 percent of the impedance of the TR set 22 at spark-level currents is examined, it is found that, at the rated TR set current limit, the impedance of the TR set 22 is x and the impedance of the CLR 24 is 0.5x. These impedances are not in time phase and cannot be added arithmetically, so the total circuit impedance in the primary is 1.11x. When a spark occurs, the TR set impedance is assumed to drop to zero for all practical purposes, and the resulting circuit impedance is now 0.5x. Since the impedance in the primary dropped by a factor 1.11/0.5, or 2.22, the primary current would increase by a factor of 2.22. In fact, since the TR set 22 still has some impedance, the current does not actually increase that much, but a significant increase does occur.

The CLR value has been selected for operation at the current limit rating of the example TR set. For operation at a lower current, a correspondingly larger inductance value could be used. This would have the practical effect of reducing spark currents, significantly lengthening the life of equipment. However, this would also limit the amount of current that could be applied to the TR set 22 and therefore restrict its output to a lower current. Many TR sets 22 are operated below their rated limited.

Measuring Resultant Precipitator Wave Shapes—Once the values and ratings of the components of the precipitator power supply are determined, the characteristics of the primary and secondary voltages and currents can be measured to determine if those values and ratings are correct. Recall that the CLR inductance value was calculated to provide nearly full conduction of the SCR stack output when the TR set is operating at its maximum ratings. This will provide a primary current wave shape that will be very nearly a sine wave 28. The secondary current wave shape will be very nearly a full-wave rectified sine wave. Two electrical measurements can be made to determine how closely the wave shapes correspond to the desired sine waveform.

One measure of how closely the primary current waveform approximates a sine wave 28 is the primary current form factor. The form factor is determined by measuring both the root-mean-square (RMS) and average primary current and then dividing the RMS value by the average. Expressed as an equation, this means form factor=RMS/Average. For an ideal sine wave 28, these are the relationships between RMS and average values and form factor:

| | |
|---|---|
| RMS value: | 0.707 of peak value |
| Average value: | 0.636 of peak value |
| Form factor: | 0.707/0.636 = 1.11 |

Precipitator power supplies operating at maximum ratings are normally designed to operate at a form factor of 1.2.

How closely the secondary current waveform approaches a rectified sine wave is the secondary current fractional conduction. This is determined by measuring the duration of the secondary current waveform and dividing it by the maximum possible duration. For a line frequency of 60 Hertz (Hz), the maximum possible duration is 8.33 milliseconds (ms), the period of a single half-cycle. Hence, secondary fractional conduction=t/T, where t is the duration of the secondary current waveform and T is the maximum possible duration. Precipitator power supplies operating at maximum ratings are normally designed to operate with a secondary fractional conduction of 0.86. Secondary fractional conduction relates to form factor as Secondary fractional conduction=(1.11/Form factor)2.

Importance Of Precipitator Wave Shapes—To illustrate the importance of precipitator wave shapes, the component values and ratings for a precipitator electrical system, and particularly the CLR 24, were selected for operation at the maximum ratings of the equipment. The table presents actual, measured values for a precipitator power supply, including form factor and secondary fractional conduction data. These indicate how closely the waveforms approximated a sine wave 28 at the primary of the TR set 22 and a full-wave rectified sine wave on the secondary. The TR set 22 has the ratings presented on page 13, and a turns ratio of 1:135.

| | | | | | | |
|---|---|---|---|---|---|---|
| RMS Primary Amps | 40 | 80 | 120 | 160 | 200 | 220 |
| RMS Primary Volts | 152 | 203 | 243 | 282 | 312 | 327 |
| Avg Secondary Milliamps | 158 | 369 | 609 | 873 | 1155 | 1307 |
| Avg Secondary Kilovolt | 25 | 27 | 29 | 30 | 32 | 33 |
| Form Factor | 1.79 | 1.56 | 1.44 | 1.35 | 1.29 | 1.26 |
| Fractional Conduction | 0.33 | 0.45 | 0.54 | 0.63 | 0.76 | 0.81 |
| SCR Firing Angle (in degrees) | 130 | 115 | 103 | 92 | 82 | 77 |
| SCR Conduction Angl (in degrees) | 50 | 65 | 77 | 88 | 98 | 103 |

For each point, multiplying the average secondary current by the turns ratio of the TR set 22 and the form factor will equal the RMS primary current. As an equation, this is represented as Average secondary current×Turns ratio×Form factor=RMS Primary current. This demonstrates clearly that the secondary current output varies directly with the form factor. Maximum electrical efficiency occurs when there is maximum output from minimum input. As the table shows, maximum electrical efficiency occurs when the form factor is lowest, at 1.2. As the form factor increases, the output decreases with respect to its input.

Because of this, it is a primary objective of this invention to maximize electrical efficiency by devising a variable CLR and CLR control 26 for the purpose of maintaining a low form factor and a high secondary fractional conduction at any given power level, thereby increasing the average voltage and current in the precipitator field for a given input.

Figure 4:
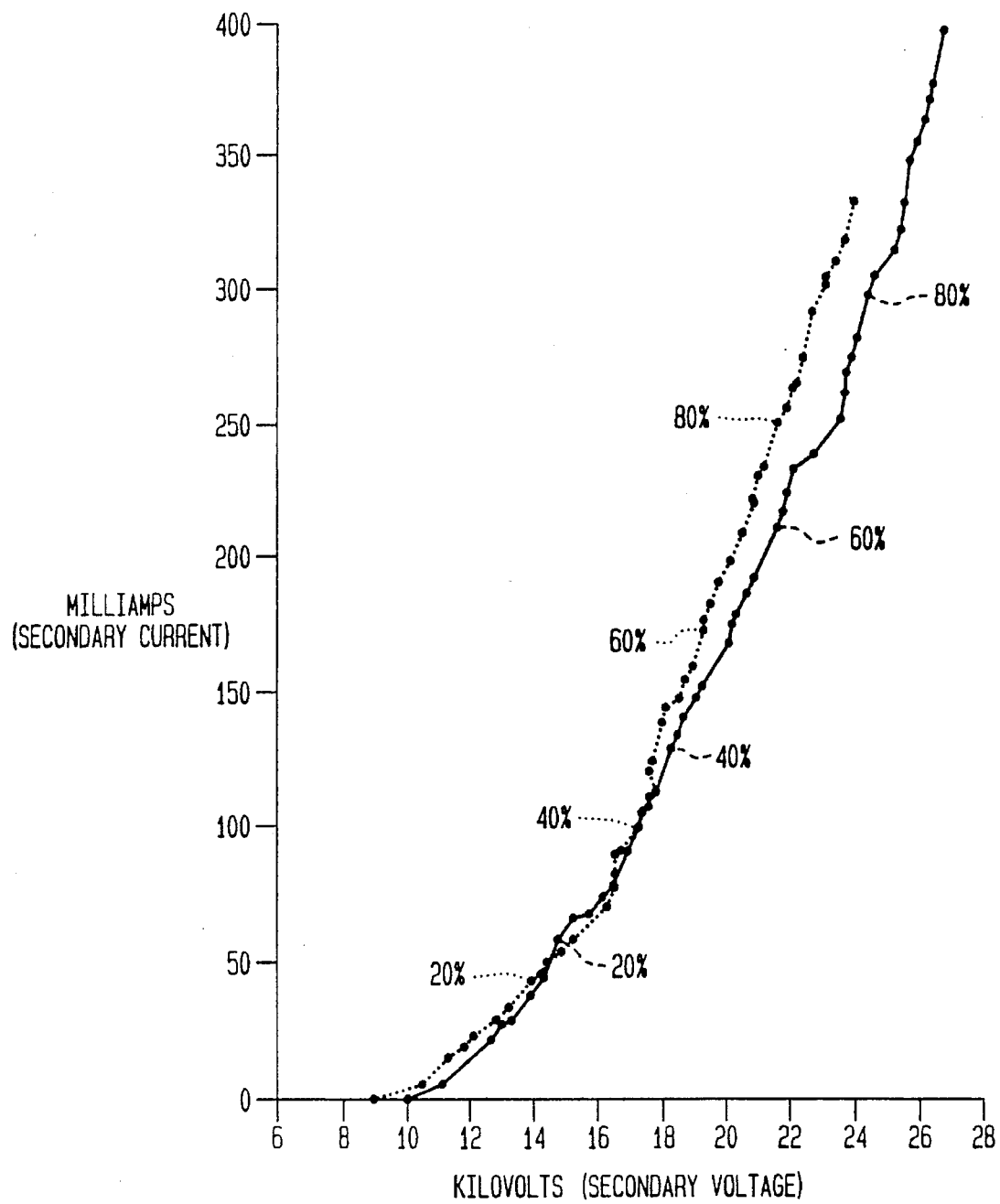
FIG. 4 is a graph of kilovolts vs. milliamps showing the advantages of the variable current limiting reactor over the prior art fixed current limiting reactor.

The secondary voltage is not subject to corresponding analysis because of the capacitive nature of the precipitator field. However, the voltage-current (VI) graph (FIG. 4) illustrates that the secondary voltage also increases as the form factor decreases. The graph on FIG. 4 is for a precipitator power supply used in a refuse burning application. Its ratings are:

| | |
|---|---|
| RMS Primary Voltage: | 460 VAC |
| RMS Primary Current: | 61 A |
| Average Secondary Voltage: | 50,000 VDC |
| Average Secondary Current: | 400 mA |

There are two plots on the graph. The first shows the voltages and currents in the precipitator field with the fixed-value CLR supplied by the manufacturer. At the primary current limit of 61A, the secondary current limit of 400 mA could not be attained. The maximum secondary current possible was 332 mA.

The second plot shows the voltages and currents in the precipitator field with a prototype variable CLR. An increase of both secondary current and voltage across the operating range is clearly indicated, as well as the fact that the secondary current limit could be achieved.

It is therefore a primary objective of this invention to maximize particulate collection efficiency by devising a variable CLR for the purpose of maintaining a low form factor and a high secondary fractional conduction at any given power level, thereby increasing the average voltage and current in the precipitator field. This in turn will cause more particulate collection to occur because the particle charge is increased, as is the attraction to the plates.

The practical limit to which the high voltage can be raised is governed by the electrical ratings of the equipment or by sparking in the precipitator field. Sparking will occur when the spark-over voltage is reached. This voltage is determined by several factors, including gas chemistry. When this voltage level is reached, voltage cannot be raised beyond it. An ideal precipitator power supply will apply power in such a manner that the peak value of the secondary voltage and current are near the average value. This will produce the maximum average secondary voltage and current before spark-over occurs.

If the precipitator waveforms have very high peaks and very low averages, measuring the precipitator wave shapes will show a high form factor and a low secondary fractional conduction. Sparking will occur on the peaks and the field will have little average secondary voltage and current needed for particulate collection.

Therefore, this invention is designed to maximize particulate collection efficiency by devising a variable CLR 24 for the purpose of maintaining a low form factor and a high secondary fractional conduction at any given power level, thereby increasing the average voltage and current in the precipitator field before spark-over occurs.

As it has been demonstrated, sparking in the precipitator field, energy management, or any condition that causes operation of the TR set below its rated limits will cause an increased form factor and a decreased secondary fractional conduction, resulting in operating inefficiencies. The voltage level at which a spark occurs changes constantly because of dynamics of the gas chemistry, temperature, and other related precipitator parameters. To maintain the desired electrical and particulate collection efficiencies, the impedance of the CLR 24 must be dynamically adjustable.

It is therefore a primary objective of this invention to maximize electrical and particulate collection efficiencies by devising a variable CLR 24 that can be dynamically adjusted by being varied electrically and automatically for the purpose of maintaining a low form factor and a high secondary fractional conduction at any power level.

This precipitator power supply is designed to have a full-wave rectified sine wave output from the TR set 22. This will contribute to the electrical and particulate collection efficiencies. SCRs 16 and 18 paired with a fixed-value current limiting reactor 24 have been shown to be superior to saturable core reactor systems. However, even SCR-CLR systems become inefficient when operated at any power level other than the limits for which the components were rated. This is because at any lower power level the SCRs have a reduced conduction angle resulting in a high form factor and a low secondary fractional conduction. It is therefore the objective of this invention to create current limiting reactor 24 that can be varied electrically and/or automatically for the purpose of overcoming these inefficiencies.

The electrically variable current-limiting reactor (EVCLR) is an improvement over the prior art fixed-value CLRs and saturable reactor systems. The EVCLR is much like a saturable reactor. Both devices have a control winding 32 which is connected to a source of DC energy. Both devices are basically inductors, the impedance of which can be varied electrically. The speed at which a change applied to the control winding appears as a change in the impedance of the device is slow in both devices. The range of variability of the inductance of the EVCLR is not as great as that of the saturable reactor.

The principal advantage of the EVCLR over the saturable reactor is that the EVCLR causes virtually no distortion to the primary current waveform, while the saturable reactor causes much distortion. The distortion caused by the EVCLR can be held to low values, on the close order of less than one percent.

Since the EVCLR is slow like the saturable reactor and has a limited range of inductance adjustment, it is not suitable as a control element if used by itself. However, in precipitator systems that use SCRs paired with a fixed-value CLR, the EVCLR can replace the fixed-value CLR and yield considerable advantage. In this application, adjustment of the CLR can now be accomplished electrically and automatically. This accomplishes all of the objectives of the invention.

The concept of EVCLR operation that is contemplated is that the impedance of the EVCLR would be adjusted to its minimum inductance value when the TR set 22 is operating at its rated limit. This would be approximately 50 percent of the TR set impedance, and would provide the optimum form factor of 1.2 and secondary fractional conduction of 0.86. When the TR set 22 is operated below its rated limit, the EVCLR can be adjusted electrically to increase its inductance, thereby maintaining a low form factor and a high secondary fractional conduction. This configuration will have the following advantages:

1) It will increase average voltage and current in the precipitator field, thereby increasing particulate collection;
2) It will minimize the destructive effect of spark currents on equipment;
3) It will increase electrical efficiency by delivering maximum electrical output for minimum input; and
4) It will increase the average voltage and current in the precipitator field before spark-over occurs.

Figure 7:
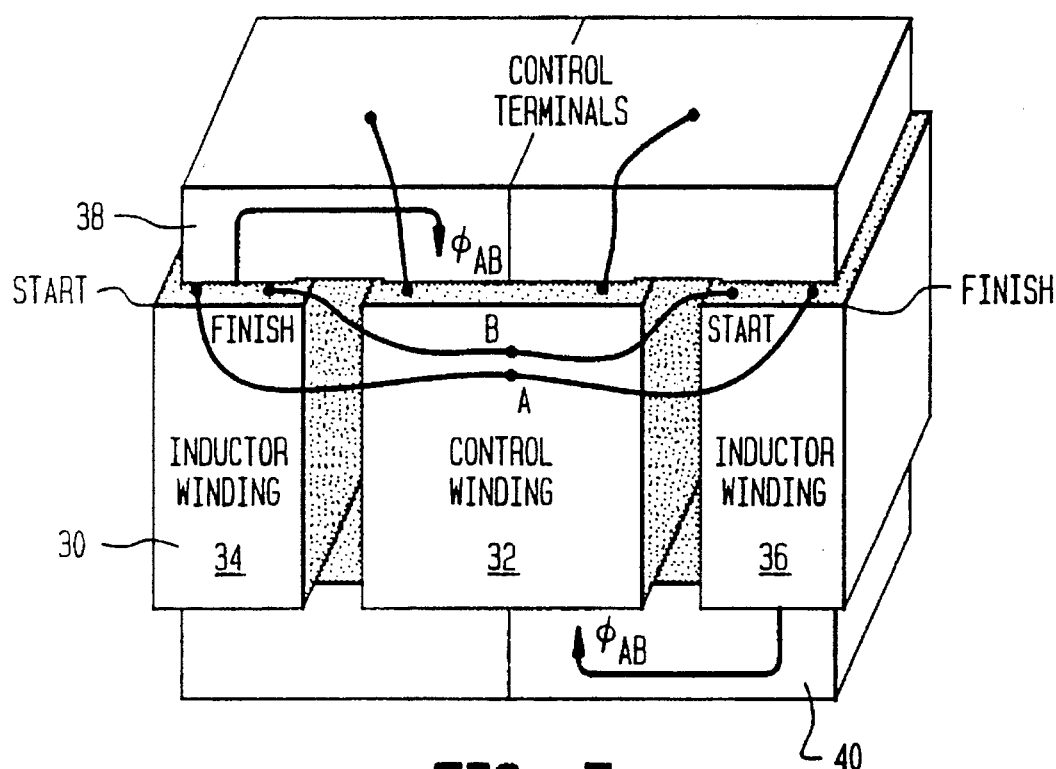
FIG. 7 is a perspective illustration of an embodiment of the electrically variable current limiting reactor shown in FIG. 6.
Figure 6:
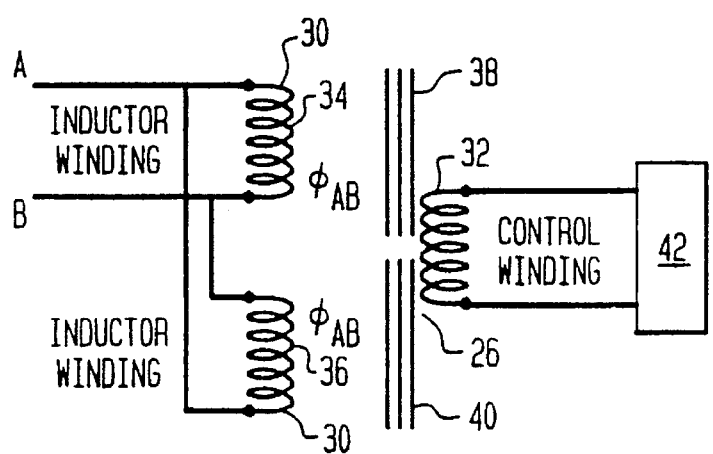
FIG. 6 is a schematic illustration of an embodiment of the general coil and core configuration for an electrically variable current limiting reactor.

The basic configuration of the EVCLR is as shown in FIGS. 6 and 7. In the schematic shown in FIG. 6 the control winding 32 is operatively connected with respect to a variable DC power source 42. The control winding is coupled with respect to the inductor winding means 30 which preferably takes the form of a first inductor winding means 34 and a second inductor winding means 36 which are basically identical with respect to one another. The first inductor winding means 34 as shown best in FIG. 7 is wound about a first core 38. In a similar manner the second inductor winding means 36 is wound about a second core 40. Preferably both the first core 38 and the second core 40 extend through the control winding 32 in opposite directions to cancel the instantaneous flux therein. This is shown further below. This configuration results in the inductance of the EVCLR device being a function of the magnitude of the DC current passing through the control winding which itself is variable responsive to different types of controls.

Various controls for modifying the DC current through the control winding 32 can include a manual adjustment which is based upon manual reading of form factor and/or secondary fractional conduction readings. This manual adjustment furthermore could be based upon any applicable physical signal or combination of physical signals such as boiler load, coal type or temperature, etc. Furthermore the adjustment of the DC power source 42 and thus the control of the amount of DC current passing through control winding 32 can be varied by an automatic adjustment responsive to the same above-identified parameters. In another possible configuration as shown in FIG. 6 an automatic electrically variable current limiting reactor can be designed utilizing the current at the primary of the transformer rectifier set 22 as the power source.

In the EVCLR as shown in FIGS. 6 and 7 as the DC power source 42 connected to the control winding 32 is reduced, the inductance increases. If a fault condition occurs which causes a loss of control winding excitation, the inductor 30 defaults to its maximum inductance value. This limits the primary current flow to its lowest and safest value. Therefore, it is a primary objective of this invention to devise a variable current limiting reactor which will automatically attain its maximum value of inductance to provide automatic protection of equipment if a fault occurs which causes a loss of control winding excitation.

Figure 5:
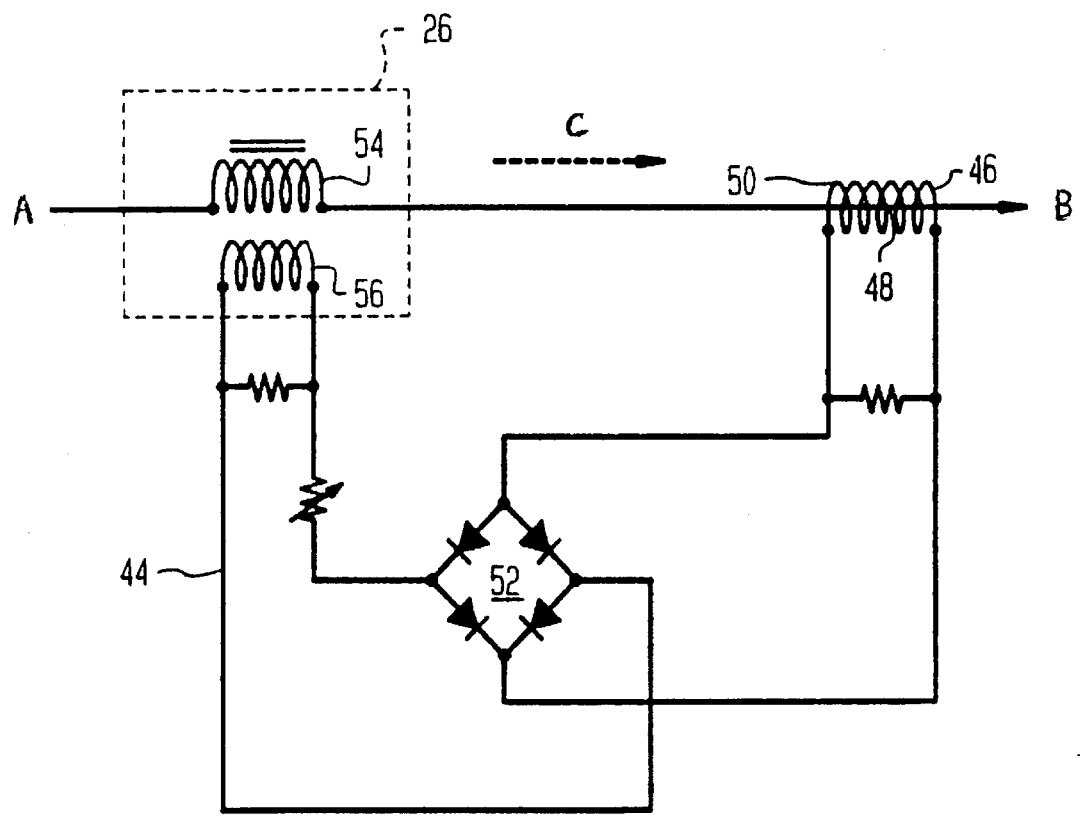
FIG. 5 is a schematic of an embodiment of an automatic electrically variable current limiting reactor.

The automatic electrically variable current-limiting reactor 44 (AEVCLR) can be constructed according to schematic illustrated in FIG. 5. The primary winding 48 of a current transformer 46 is placed in series with the AEVCLR. The secondary winding 50 of the current transformer is connected to a full-wave bridge rectifier 52. The DC output of the full-wave bridge rectifier is connected to the control winding 56 of the AEVCLR.

This configuration provides for automatic adjustment of the current-limiting reactor 24. The inductance will be inversely proportional to the primary current. As the primary current increases, the DC signal to the control winding 56 increases. This causes a proportional decrease in the inductance of the CLR inductor winding means 54 of the current limiting reactor. Conversely, as the primary current decreases, the DC signal to the control winding 56 decreases. This causes a proportional increase in the inductance of the CLR inductor winding 54 of the current-limiting reactor.

This configuration will automatically adjust the inductance of the AEVCLR 44 by responding to changes in operating conditions of the TR set 22, thereby maintaining a low form factor and a high secondary fractional conduction at any given power level and thus achieving all of the stated objectives of this invention.

Design And Construction Of The EVCLR—The design considerations for an electrically-variable current limiting reactor (EVCLR) are:

Nominal system voltage;

Rated current;

Inductance required at rated operating current;

Inductance required at one-half of rated operating current;

Maximum temperature rise of the EVCLR;

Non-saturation of the inductor when the full primary voltage is impressed across it;

The inductance over the general operating range (from one-half to full operating current) shall be inversely proportional to the operating current, ensuring that the inductance is nearly optimal; and Distortion should be kept at a minimal level over the entire operating range.

Figure 8:
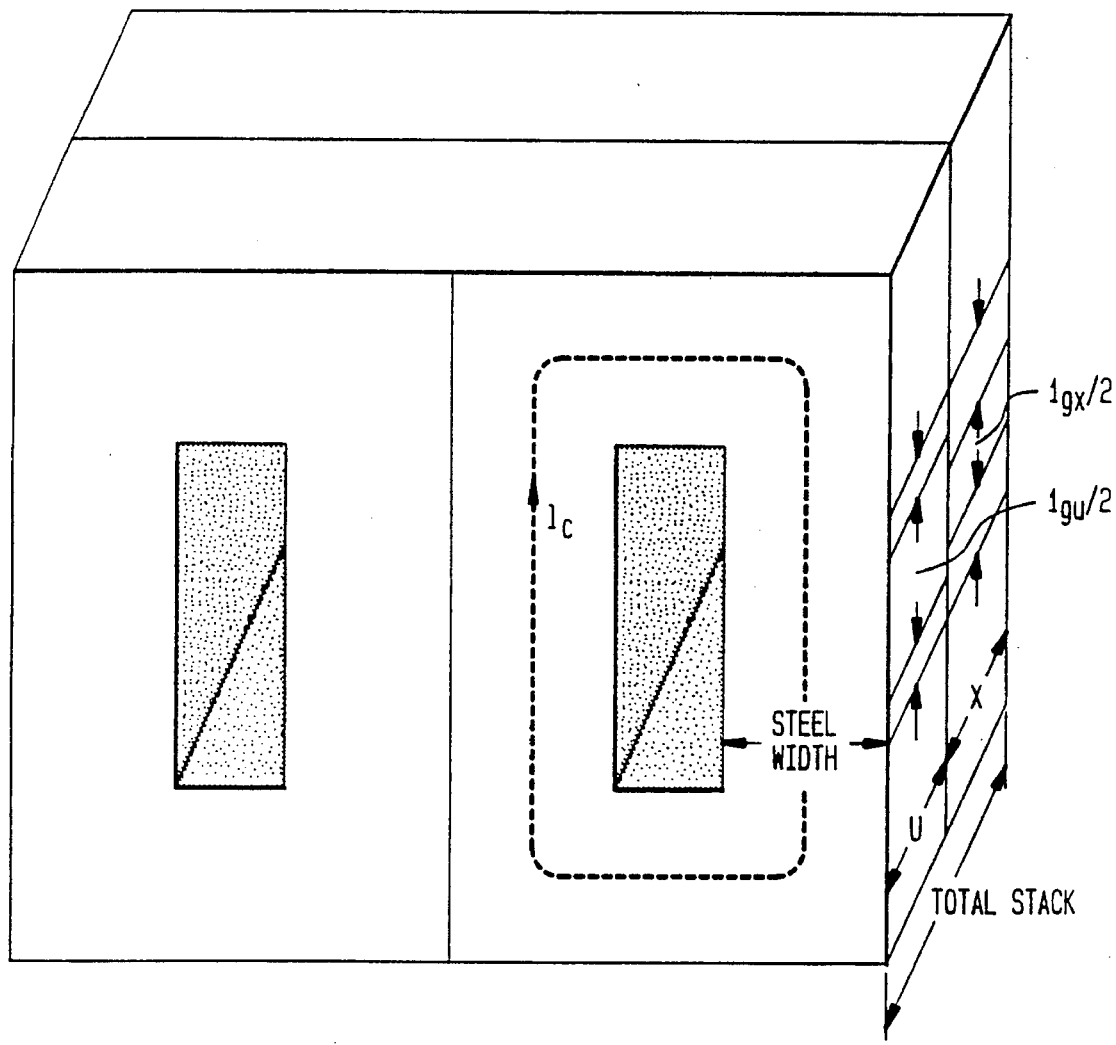
FIG. 8 is a perspective illustration of an embodiment of the general coil and core configuration for an electrically variable current limiting reactor.
Figure 9:
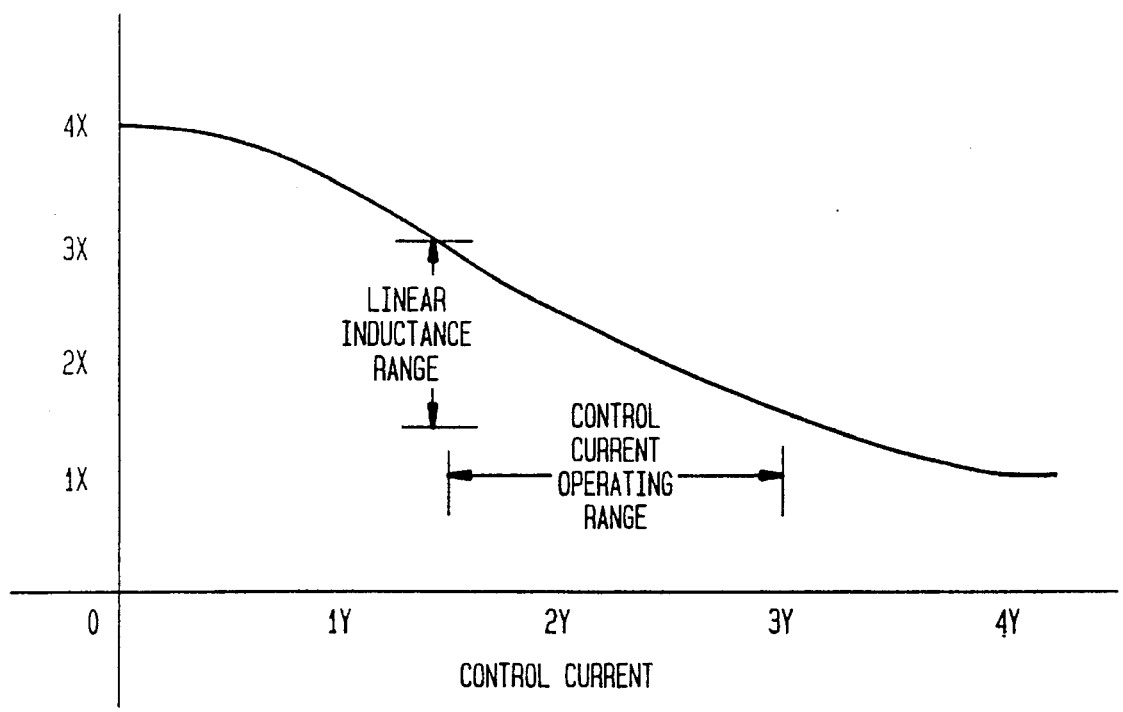
FIG. 9 is a graph of a transfer function of an electrically variable current limiting reactor.

The design procedure for a representative EVCLR is shown in FIGS. 6, 7 and 8. FIGS. 6 and 7 present the general coil and core configuration of the device. Two identical inductor windings 34 and 36 are mounted on two cores 38 and 40 and connected in parallel as shown. Alternating currents in the inductor windings 30 result in an alternating flux in each core. The windings are connected so that the instantaneous flux coupled to the control winding, which is common to both cores, is always zero. Hence, if everything is balanced, there is no induced voltage in the control winding. In actual practice, the center leg of the core can be magnetically coupled. Two separate core structures are not required.

A magnetomotive force caused by DC current in the control winding 32 does, however, cause equal magnetic drops in both cores 38 and 40. These drops cause changes in reluctance of the magnetic paths and hence changes in inductance. As such, the inductance value of the device is a function of the magnitude of the direct current in the control winding 32.

It should be noted that the EVCLR as illustrated is two inductors in parallel, each of which conducts half of the load current. Each individual inductor, therefore, must be designed for twice the required inductance and half of the rated current.

The EVCLR must be designed not to saturate when the full primary voltage is impressed across it. During sparking, the full primary voltage appears across the EVCLR. In this example, the maximum AC flux density will therefore be limited to 16 kilogauss (one kilogauss equals 1000 lines of flux per square centimeter) at full primary voltage for M-6 29-gauge electrical steel. This density (B) can be calculated as follows:

$$B=3875Ep/NAf$$

where Ep is the system primary voltage, N is the number of turns, A is the inductor core area in square inches, and f is the line frequency in Hertz (cycle per second).

The individual inductors must be designed for half the maximum continuous current expected.

Generally, a 110-degree Celsius (C) temperature rise is acceptable for this type of device. For a 110-degree rise, it is important to use a 180-degree insulation system. This allows for a rise of 110-degree rise above a 40-degree ambient temperature as well as a 30-degree "hot spot". For higher ambient temperatures, adjustments must be made in the design.

The choice of aluminum or copper for windings is entirely discretionary. If aluminum is used, a current density of approximately 1000 amps (A) per square inch is a good starting point. For copper, the figure should be 1450A/in2. Coil watt-densities for either conductor should be approximately 0.4 watts per square inch at 20 degrees Celsius. It should be noted that significant losses will occur in the windings owing to fringing around the gaps under the inductor windings.

The general requirement for inductance for the example EVCLR will be 1.5×mH at rated current and 3.0×mH at one-half of rated current, providing a desirable and usable control range.

To accomplish "automatic control", the AC line current in the lines is transformed to a suitable level, then rectified. This DC signal is supplied to the control winding of the EVCLR. The DC signal has little ripple because of the high inductance inherent in the control winding. The control current is therefore proportional to the average of the primary load current. However, it should be noted that the control current is proportional to the RMS of the load current only if the form factor remains constant. To operate effectively, the EVCLR must also be operated in the more linear portion of its range as shown in the graph in FIG. 8. As illustrated, the design range for the example inductor must be approximately 4 to 1. The inductance will, therefore, be four times as high with no control current (0 amps) as it is when the device is fully saturated.

To meet the above requirements and still ensure low harmonic distortion, the inductor is constructed with two different air gaps. FIG. 8 shows the general construction used. Each of the pair of inductors has two large air gaps and two small ones.

The general design criteria are:

$$Ax/Au=2.4$$

$$lc/lgx=60$$

$$lc/lgu=500$$

where lc is the mean length of the magnetic path (steel), lgx and lgu are the lengths of the air gaps in the X and U portions of the core, respectively, and Ax and Au both are the area of steel in the x and u portions, respectively.

The inductance range can then be calculated to be from sections U and X both being completely unsaturated (high relative permeability) to section U being completely saturated. In this condition, it is as if section U does not exist.

Derivation of the design equations proceeds in this manner:

$$L=No/I$$

$$o=NI/R$$

where N is turns, o is total flux lines, I is current and R is reluctance
(magnetic resistance) by substitution:

$$L=N2/R$$

for an air gap, iron-core circuit;

$$R=(lc/uourAc)+(lg/uoAc)$$

where lc is the core mean length, lg is the air gap length, uo is the permeability free space (3.19×10−8 H/IN"), ur is the relative permeability of steel, and Ac is the core area Thus, the general inductance equation:

$$L=(3.19\times 10-8)N2Ac/[lc/ur)+lg]$$

For the purposes here, ur will be considered either very high (infinite) or very low (zero).

The inductance equation can then be simplified to $$L=(3.19\times 10-8)N2/lg/Ac$$

This equation will be used to calculate the two extreme conditions of inductance: Section U completely saturated, and section u not saturated.

Let $Ru=lgu/Au$ and $Rx=lgx/Ax$

Since reluctance in magnetic circuits is analogous to resistance in electrical circuits, $$RT=RuRx/(Ru+Rx)$$

The high and low inductance limits are now calculated using the following equations in conjunction with previously-cited general criteria:

$$Lmin=(3.19\times10-8)N2/Rx$$

where $$Rx=lgx/Ax$$

and $$Lmax=(3.19\times10-8)N2/RT$$

where $$RT=RuRx/(Ru+Rx)=(lgulgx/AuAx)/[lgu/Au)+(lgx/Ax)]$$

It is important to recall that the goal of this sequence is to achieve a relationship for the example inductor wherein Lmax is 4×Lmin.

The control winding must be designed and matched to the primary load current with several factors borne in mind:

Temperature rise of control winding;

Correct ampere-turns for proper full-current inductance; and

Available current transformer.

Design assumptions:

Load current form factor of 1.2.

For 100 degrees (C) temperature rise, 0.55 watts per square inch at 20 degrees should be used on the control winding.

The DC current should be calculated by using:

B=(0.155NIDC)/(3131gu)

Use B=20 kilogauss.

In FIG. 4 the V-I curve of the original CLR is shown as a dotted line whereas the V-I curve for the variable CLR is shown as a solid line (2X inductance change). The percentage figures show the percent of primary current limit for each. It should be noted that the curves stop where primary current limit is reached. Also, in FIG. 5 the primary current is shown by reference character C and electrical connection to the SCR's is shown as reference character A and to the TR set is shown as reference character B.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An electrically variable power supply means having a control means with low distortion characteristics for use with an electrostatic precipitator comprising:
   a) a silicon controlled rectifier stack electrically connected to an AC input voltage line;
   b) a SCR voltage control means operatively connected with respect to said silicon controlled rectifier stack to control voltage output therefrom;
   c) a transformer rectifier set in series with respect to the output of said silicon controlled rectifier stack, said transformer rectifier set including a TR input signal and a TR output signal, said transformer rectifier set including:
      1) a step-up transformer means adapted to receive said TR input signal and increase voltage and decrease current thereof;
      2) a full wave rectifier means adapted to receive an AC signal from said step-up transformer means for rectifying thereof, said full wave rectifier means adapted to generate said TR output signal; and
   d) a current limiting reactor positioned electrically in series between the output of said silicon controlled rectifier stack and said transformer rectifier set, said current limiting reactor being electrically variable, said current limiting reactor including an automatic CLR control means operatively responsive to the current of said TR input signal to vary the inductance of said current limiting reactor, said automatic CLR control means including:
      1) a CLR current transformer comprising:
         (a) a CLR primary placed in series between said silicon controlled rectifier stack and said transformer rectifier set;
         (b) a CLR secondary winding electrically coupled with respect to said CLR primary winding;
      2) a CLR full wave rectifier electrically connected with respect to the output of said CLR secondary winding;
      3) a CLR inductor winding means in series between said silicon controlled rectifier stack and said CLR current transformer; and
      4) a CLR control winding electrically connected to the output of said CLR full wave rectifier, said CLR control winding being electrically operatively coupled with respect to said CLR inductor winding means to control the inductance thereof responsive to the output of said CLR full wave rectifier.

2. An electrically variable power supply means having a control means with low distortion characteristics for use with an electrostatic precipitator as defined in claim 1 wherein said CLR full wave rectifier is a CLR full wave bridge rectifier.

3. An electrically variable power supply means having a control means with low distortion characteristics for use with an electrostatic precipitator as defined in claim 1 wherein the inductance of said CLR inductor winding means is inversely proportional to the current flow through said CLR primary winding.

4. An electrically variable power supply means having a control means with low distortion characteristics for use with an electrostatic precipitator comprising:
   a) a silicon controlled rectifier stack electrically connected to an AC input voltage line, said silicon controlled rectifier stack comprising two silicon controlled rectifiers electrically connected in an inverse-parallel relationship with respect to one another and being in series with respect to the AC input voltage line;
   b) a SCR voltage control means operatively connected with respect to said silicon controlled rectifier stack to control voltage output therefrom;
   c) a transformer rectifier set in series with respect to the output of said silicon controlled rectifier stack, said transformer rectifier set including a TR input signal and a TR output signal, said transformer rectifier set including:
      1) a step-up transformer means adapted to receive said TR input signal and increase voltage and decrease current thereof;

2) a full wave rectifier means adapted to receive an AC signal from said step-up transformer means for rectifying thereof, said full wave rectifier means adapted to generate said TR output signal; and d) a current limiting reactor positioned electrically in series between the output of said silicon controlled rectifier stack and said transformer rectifier set, said current limiting reactor being electrically variable, said current limiting reactor including an automatic CLR control means operatively responsive to the current of said TR input signal to vary the inductance of said current limiting reactor, said automatic CLR control means including:

1) a CLR current transformer comprising:
  (a) a CLR primary winding placed in series between said silicon controlled rectifier stack and said transformer rectifier set;
  (b) a CLR secondary winding electrically coupled with respect to said CLR primary winding;
2) a CLR full wave bridge rectifier electrically connected with respect to the output of said CLR secondary winding;
3) a CLR inductor winding means in series between said silicon controlled rectifier stack and said CLR current transformer; and
4) a CLR control winding electrically connected to the output of said CLR full wave bridge rectifier, said CLR control winding being electrically operatively coupled with respect to said CLR inductor winding means to control the inductance thereof responsive to the output of said CLR full wave bridge rectifier, the inductance value of said CLR inductor winding means being inversely proportional to the current flow through said CLR primary winding, said CLR inductor winding means being operative to maximize inductance thereof responsive to deactivation of said CLR control means.

5. An improved electrically variable current limiting reactor for use with an electrostatic precipitator power supply including a silicon controlled rectifier stack electrically connected to an AC input voltage line, a SCR voltage control means operatively connected with respect to the silicon controlled rectifier stack to control voltage output therefrom, a transformer rectifier set in series with respect to the output of step-up transformer means adapted to receive a TR input signal and a full wave rectifier means adapted to receive an AC signal from the step-up transformer means for rectifying thereof and generation of a TR output signal, wherein the improvement comprises a variable current limiting reactor positioned electrically in series between the silicon controlled rectifier stack and the transformer rectifier set, said variable current limiting reactor including an automatic CLR control means operatively responsive to the TR input signal to vary the inductance of said current limiting reactor, said automatic CLR control means including:

a) a CLR current transformer comprising:
  1) a CLR primary winding placed in series between the silicon controlled rectifier stack and the transformer rectifier set;
  2) a CLR secondary winding electrically coupled with respect to said CLR primary winding;
b) a CLR full wave rectifier electrically connected with respect to the output of said CLR secondary winding;
c) a CLR inductor winding means in series between the silicon controlled rectifier stack and said CLR current transformer; and
d) a CLR control winding electrically connected to the output of said CLR full wave rectifier, said CLR control winding being electrically operatively coupled with respect to said CLR inductor winding means to control the inductance thereof responsive to the output of said CLR full wave rectifier.

6. An improved electrically variable current limiting reactor as defined in claim 5 wherein said CLR full wave rectifier is a CLR full wave bridge rectifier.

7. An improved electrically variable current limiting reactor as defined in claim 5 wherein the inductance of said CLR inductor winding means is inversely proportional to the current flow through said CLR primary winding.

* * * * *

UNITED STATES PATENT AND TRADEMARK OFFICE
CERTIFICATE OF CORRECTION

PATENT NO.   : 5,515,262
DATED        : May 7, 1996
INVENTOR(S)  : David F. Johnston   Peter T. Bircsak It is certified that error appears in the above-identified patent and that said Letters Patent is hereby corrected as shown below:

On the title page, item [73]
Assignee: Change "BHS" to -- BHA --.

Signed and Sealed this

Tenth Day of September, 1996

*Attest:*

BRUCE LEHMAN

*Attesting Officer*   *Commissioner of Patents and Trademarks*